(12) United States Patent
Arn

(10) Patent No.: US 9,091,376 B2
(45) Date of Patent: Jul. 28, 2015

(54) METHOD OF FORMING AN INTERNAL TUBE BEADLOCK

(75) Inventor: Michael G. Arn, Van Wert, OH (US)

(73) Assignee: Eaton Corporation, Cleveland, OH (US)

(*) Notice: Subject to any disclaimer, the term of this patent is extended or adjusted under 35 U.S.C. 154(b) by 572 days.

(21) Appl. No.: 12/982,106

(22) Filed: Dec. 30, 2010

(65) Prior Publication Data

US 2012/0167655 A1  Jul. 5, 2012

(51) Int. Cl.
*B25B 27/14* (2006.01)
*F16L 13/14* (2006.01)
*B21D 17/02* (2006.01)

(52) U.S. Cl.
CPC ............ *F16L 13/14* (2013.01); *B21D 17/025* (2013.01)

(58) Field of Classification Search
CPC ........ F16L 13/14; B21D 17/025; B21D 17/02
USPC ............... 29/508, 510, 512, 283, 283.5, 278; 285/382, 382.4, 382.5; 403/274, 282
See application file for complete search history.

(56) References Cited

U.S. PATENT DOCUMENTS

| | | | |
|---|---|---|---|
| 2,477,676 A | 8/1949 | Woodling | |
| 3,381,515 A | 5/1968 | Orloff | |
| 3,575,033 A | 4/1971 | Meyer, Jr. | |
| 3,778,090 A | 12/1973 | Tobin | |
| 3,924,883 A | 12/1975 | Frank | |
| 4,104,902 A | 8/1978 | Cease | |
| 4,606,214 A | 8/1986 | Miyazaki | |
| 4,622,732 A * | 11/1986 | Broderick | 29/421.1 |
| 4,765,661 A * | 8/1988 | Fukushima et al. | 285/382.5 |
| 4,805,945 A | 2/1989 | Foucault et al. | |
| 5,901,987 A * | 5/1999 | Godeau | 285/148.19 |
| 6,062,060 A | 5/2000 | Nguyen | |
| 6,572,358 B1 | 6/2003 | Blethen | |
| 6,928,732 B2 * | 8/2005 | Sakai et al. | 29/890.144 |

FOREIGN PATENT DOCUMENTS

GB   2024973 B   11/1982

OTHER PUBLICATIONS

Internationl Search Report for PCT/US2011/067820.

* cited by examiner

*Primary Examiner* — Lee D Wilson
*Assistant Examiner* — Nirvana Deonauth
(74) *Attorney, Agent, or Firm* — Fishman Stewart Yamaguchi PLLC

(57) ABSTRACT

A unique tube punch forming die assembly and process is disclosed for forming a bead lock on a malleable fluid conveyance tube which provides for the attachment of a fluid connector to the tube. The fluid connector is held in the tube punch forming die constituting a die assembly where a forming groove is machined in the internal cavity of the fluid connector for forming a bead lock within the inside the fluid connector when the punch forming die is compressed into the tube. The tube is first inserted into the punch forming die, then the die is punched to buckle the tube to form a bead lock in the tube inside the fluid connector as the end of the tube held in a cylindrical support ring.

19 Claims, 2 Drawing Sheets

METHOD OF FORMING AN INTERNAL TUBE BEADLOCK

TECHNICAL FIELD

A punch die holds a fluid connector for forming a bead lock on the end of a cylindrical tube internal to the fluid connector thereby eliminating the need for either brazing or post process plating.

BACKGROUND

There are many applications in which a bead lock is formed at the end of a malleable cylindrical tube. Such bead locks are utilized to secure the tube to hoses or to some type of fluid device such as a hydraulic pump or valve. Such bead locked tubes are also used for securing tubes to systems carrying fluids such as fuel or brake fluids.

To form the bead lock on the end of a tube, it has been known to utilize a die assembly to radially deform and thereby expand the tube to form the bead lock separate from or external to the fluid connector. These die assemblies typically comprise a holder secured to the tube to prevent undesired axial movement of the tube relative to the die when the forming operation is performed. According to the prior art, the tubing holder and the forming die are moved together thereby radially expanding the tube into the forming surfaces formed on both the holder and the die separate from any type of fluid connector. The fluid connector is then joined to the longer tube by furnace brazing. In that process, the forming surface of the die would deform the surface of the bead lock axially closest to the free end of the tube while the forming surface on the tube holder would form the opposite axial end of the bead lock if one is needed. The heat applied during the brazing process causes the tube to deform slightly resulting in a misaligned assembly that must be either re-worked or discarded.

The disclosure of U.S. Pat. No. 6,572,358 to Blethen describes a die assembly for forming a bead lock on a cylindrical tube which includes a holder which secures the tube against axial movement so that a portion of the tube protrudes outwardly from the holder along a pre-determined axis and in which the holder has a forming surface which lies against the tube to be formed. The die assembly of the '358 patent further includes a first die part having a cylindrical mandrel aligned with and engaging with the tube. In its first position, the holder abuts against the second die part while the second die part is in its extended position. Conversely, as the holder is moved to its second position relative to the first die position the holder moves the second die part to its retracted position thus radially outwardly deforming the bead lock between the forming surface in the holder and the conical surface on the sleeve. Since the through bore formed in the second die part circumscribes and constrains the tube around the bead lock during the entire formation of the bead lock, and also since the holder remains in contact with the second die part during the entire deformation process, the bead lock is not only accurately formed on the tube, but the possibility of a burr forming between the holder and the second die part is altogether eliminated.

Thus, it is evident that while this prior art die assembly for forming a bead lock on a cylindrical tube produces a satisfactory product, it does so while using a very complicated and expensive piece of forming equipment separate from the fluid connector. More importantly, the bead locked tube is then brazed to a longer length of tubing and all of the assembled pieces must be thoroughly cleaned prior to the brazing process. The heat applied for brazing warps the components in an unpredictable manner requiring re-work or the parts to be discarded.

Another well known method of forming a bead lock on a cylindrical tube is disclosed in U.S. Pat. No. 3,575,033 to Meyer. In the '033 patent, a die member contains an annular passage that surrounds the exterior of a tube end and a guide pin that extends into the passage in the tube beyond the location of a desired bead lock. The tube is clamped into a holder at the approximate location of the bead lock and a force is applied to the die member to move the member toward the holder. This movement deforms the tube wall outward between the die member and the holder, thus forming a bead lock on the tube at a point remote from the tube end and separate from any type of fluid connector. This tubing bead locker does not control the outside diameter of the bead lock formed on the cylindrical tubing so that the process itself must be altered and changed to control the outside diameter of the bead lock by varying the degree that the die member is axially moved depending on the wall thickness and spring characteristics of the tube itself. Subsequently, the bead locked tube is assembled to a fluid connector and then brazed to a long tube.

The prior art processes includes cutting the unplated tubes to length; clean the components to prepare for brazing; form the outside diameter of the global nipple; furnace braze the joint; apply a trivalent plating to the joint; inspect for internal rust or corrosion and if required, sand blast and lube; end form the mating end per customer requirement; bend the assembly to print; and finally ship to stock.

SUMMARY

The tube punch forming die of the present disclosure holds the fluid connector and a sizing mandrel that constitutes a die assembly. Using this punch die, a bead lock is formed internal to the fluid connector where a bead lock forming groove of the fluid connector closely controls the dimensions of the bead lock that is formed in the tubing that retains and seals the tube to the connector by performing the bead lock forming process inside the connector. The tube concurrently engages the sizing mandrel which maintains the minimum inside diameter of the tube as the bead lock is formed.

The inside contour of the cavity in the fluid coupling is designed to hold the open end of the tube in a support ring while the tube bead lock is formed by punching the die assembly while holding the end of the tube stationary in the fluid connector and allowing the side of the tube to buckle into the bead lock forming groove when the die is activated. The bead lock is formed inside the fluid connector and thus, the fluid connector is already assembled to the tube without a brazing operation which would require cleaning, heating and subsequent plating. In the process disclosed in this application, long sections of tube can be used without deformation over its length because brazing is not used to attach a bead locked tube to a longer section of straight tube. The present disclosure is a method of forming a bead lock inside a fluid connector having a hose nipple to retain the connector on a plated tube without using brazing.

The new process includes the following steps: cut tubing having a trivalent coating to length; end form mating end per customer requirement; end form hose end; bend the assembly to print; ship to stock. The exemplary tube forming process is a two punch process where the first punch reduces the end diameter of the tube and can be performed on a Manchester end former. The second punch uses a punch die which holds the fluid connector and installs the nipple and creates the bead lock internally in a bead lock forming groove formed inside the connector. Since there is no brazing or welding process involved, the tube remains basically straight since it is not subjected to high levels of heat. The absence of heat results in a relatively straight tube that can be accurately bent.

This new process also allows for the retention of rust inhibitors or oils on the inside or on the outside of the tube to prevent corrosion. The use of brazing or welding would require that the tube be cleaned both internally and externally of all contamination if the braze or weld is going to be successful. Once the rust inhibitor or oil is removed, rust can rapidly form and is considered a contaminant which has to be removed prior to use and is especially difficult to remove once the trivalent plating is applied.

DETAILED DESCRIPTION

Figure 1:
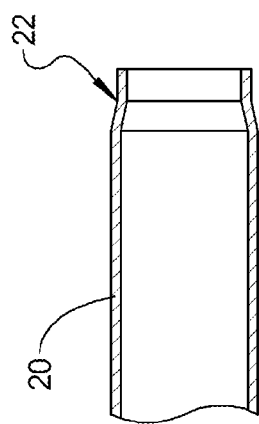
FIG. 1 is a cross-sectional view of the fluid conveyance tube after the end diameter of the tube has been reduced.

Referring now to the discussion that follows and also to the drawings, illustrative approaches to the disclosed systems and methods are shown in detail. Although the drawings represent some possible approaches, the drawings are not necessarily to scale and certain features may be exaggerated, removed, or partially sectioned to better illustrate and explain the present disclosure. Further, the descriptions set forth herein are not intended to be exhaustive or otherwise limit or restrict the claims to the precise forms and configurations shown in the drawings and disclosed in the following detailed description.

Moreover, a number of constants may be introduced in the discussion that follows. In some cases illustrative values of the constants are provided. In other cases, no specific values are given. The values of the constants will depend on characteristics of the associated hardware and the interrelationship of such characteristics with one another as well as environmental conditions and the operational conditions associated with the disclosed system.

Now referring to FIG. 1 of the drawings, a partial cross-sectional view of a fluid conveyance tube 20 is shown after an end of the tube 20 has been "necked down" to a specified diameter using a first punch forming die or other tube forming process. A Manchester tubing former machine can be used to neck down the tube 20. The tube 20 is preferably burr free and has an oil or other rust inhibitor can be applied to its inner and outer surfaces or the surface can be plated. The tube 20 is preferably fabricated of some type of formable metal or metal alloy and can be plated with a process such as a trivalent plating. Other protection coatings or plating processes can be used when using the exemplary bead lock forming process since no high heat is applied to the tubing unlike when brazing is required.

Figure 2:
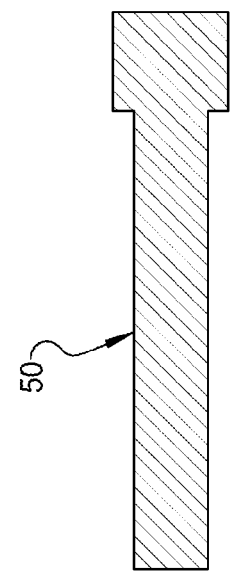
FIG. 2 is a cross-sectional view of the exemplary fluid connector and punch die and sizing mandrel.
Figure 2:
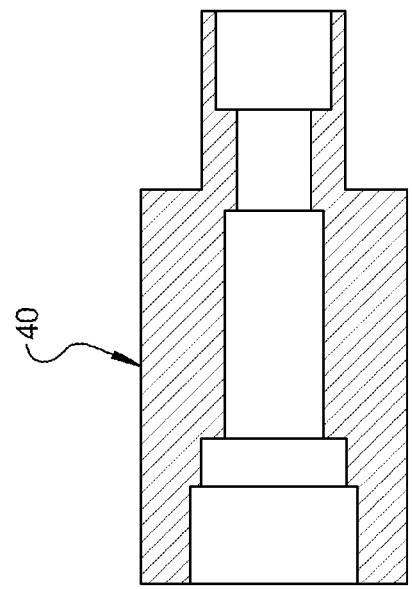
Figure 2:
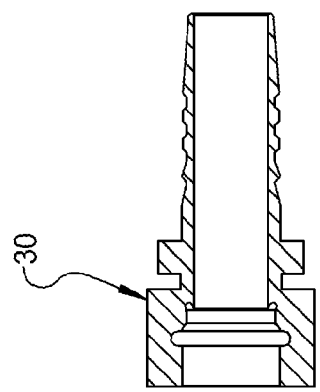

Now referring to FIG. 2 of the drawings, a cross-sectional view of a fluid connector 30 and a second punch forming die 40 and a sizing mandrel 50 are shown. These three elements make up a die assembly. The fluid connector 30 is inserted into and is temporarily held by the second punch forming die 40 during a second punch forming process to form a bead lock 24 (see FIG. 5) on the tube 20. Prior to the second punch forming process, a sizing mandrel 50 is inserted into the forming die 40 and engages the inside diameter of the fluid connector 30 to maintain a minimum inside diameter of the tube 20 when the bead lock 24 is formed by hitting the punch die 40.

Figure 3:
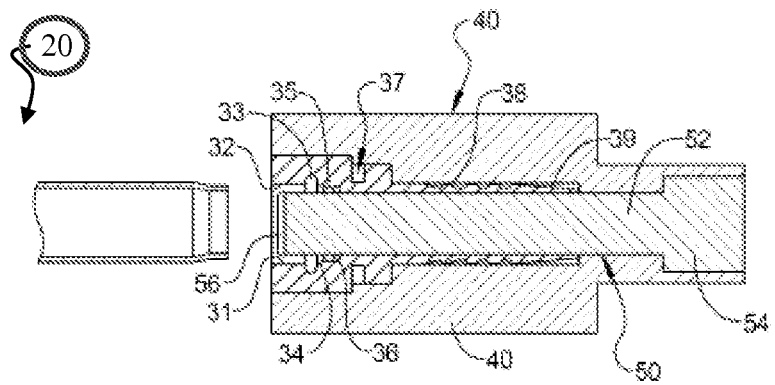
FIG. 3 is a cross-sectional view of the tube just prior to insertion into the fluid connector and the sizing mandrel which are held by the punch die.

Now referring to FIG. 3 of the drawings, a cross-sectional view of the exemplary punch forming die 40 holding the fluid connector 30 and the sizing mandrel 50 making a die assembly 41 just prior to insertion and forming of a tube bead lock 24 on the tube 20 is shown. For clarity, the second punch forming die 40 is not shown which holds the fluid connector 30 and the sizing mandrel 50 as the tube 20 is inserted into the fluid fitting 30 and the punch die 40 is "hit". The internal cavity of the fluid fitting 30 is shaped to accommodate the tube 20 and hold it in position as the second punch die 40 is hit to form the bead lock 24. Also not shown is some type of holding device for the tube 20 which must hold the tube 20 in relative position to the punch die 40 as the bead lock 24 is formed.

The inner cavity of the fluid connector 40 includes several individual cylindrically shaped cavities and surfaces. Lead section 32 guides the tube into the fluid connector 40 and over the sizing mandrel 50. Bead lock forming groove 33 is shaped so that the tube 20 buckles into the bead lock forming groove 33 to form a bead lock 24 having the desired dimensions. Chamfer section 34 allows the tube 20 to transition into the cylindrical support ring 35 just prior to the bead lock forming operation. The end of the tube 20 is held in the fluid connector 30 against an inner surface 36' of the end support 36 when the bead lock 24 is formed by impacting the punch die 40. In particular, as illustrated and exemplified in FIGS. 4 and 5, the end of the tube 20 is held in direct contact against the inner surface 36' of the end support 36 when the bead lock 24 is formed by impacting the punch die 40.

Figure 4:
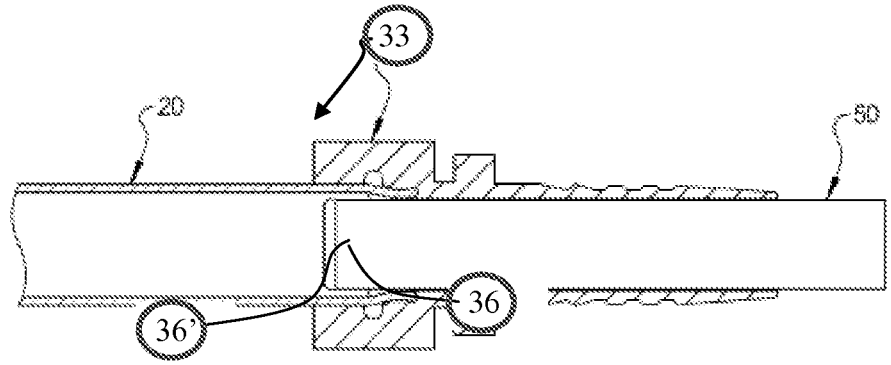
FIG. 4 is a cross-sectional view of the tube fully inserted into the fluid connector and into the sizing mandrel just prior to forming.

Now referring to FIG. 4 of the drawings, a cross-sectional view of the tube fully engaged in the second punch forming die 40 and over the sizing mandrel 50. The internal diameter of the tube 20 is opened up to a specified diameter when the sizing mandrel 50 is forced inside the tube 20 as the punch forming die 40 and the fluid connector 30 are forced into the end of the tube 20. The end of the tube 20 is shown as positioned against the end support 36 and has reached the end of its travel. Further movement of the punch forming die 40 would cause a buckling of the wall of the tube 20 into the inner cavities 32-36 of the fluid connector 30.

Figure 5:
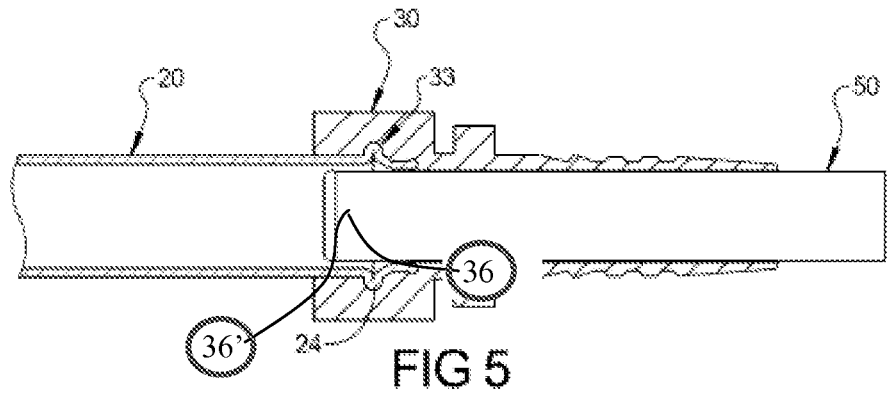
FIG. 5 is a cross-sectional view of the tube with a formed bead lock inside the fluid connector and over the sizing mandrel.

Now referring to FIG. 5 of the drawings, a cross-sectional view of the tube fully engaged with the second punch die 40 (see FIG. 3) and buckled at the bead lock 24 into the inner cavities 32-36 of the fluid connector 30 is shown. The inner cavity of the fluid connector 40 includes several individual cylindrically shaped cavities and surfaces. Lead section 32 guides the tube into the fluid connector 40 and over the sizing mandrel 50. Bead lock forming groove 33 is shaped so that the tube 20 buckles into the bead lock forming groove 33 to form a bead lock 24 having the desired dimensions. Chamfer section 34 allows the tube 20 to transition into the cylindrical support ring 35 just prior to the bead lock forming operation. Adjacent to the support ring 35 is an end support 36. The end of the tube 20 is held in the fluid connector 30 at the end support 36 when the bead lock 24 is formed by impacting the punch die 40. Upon impact of the second punch die 40, the wall of the tube 20 is buckled outward in a cylindrical fashion to occupy the bead lock forming groove 33. In this manner, the tube bead lock 24 has been formed while completely internalized inside the fluid connector 30 which is held in the punch forming die 40.

After the bead lock 24 is formed, the mandrel 50 is withdrawn and the punch die 40 is pulled away from the fluid connector 30 and the connected tube 20. The assembly is then ready for final bending of the tube and connection of a socket (not shown) to the socket groove 37 and then a hose (not shown) over the connector chamfer 39 and onto to the hose nipple 38. The socket is then crimped to apply a clamping force on the hose over the hose nipple 38. The bead lock 24 holds and seals the tube 20 to the fluid connector 30. Since no brazing is required, the inner surface of the tube 20 can be protected against corrosion before and after all forming operations.

The present disclosure has been particularly shown and described with reference to the foregoing illustrations, which are merely illustrative of the best modes for carrying out the disclosure. It should be understood by those skilled in the art that various alternatives to the illustrations of the disclosure described herein may be employed in practicing the disclosure without departing from the spirit and scope of the disclosure as defined in the following claims. It is intended that the following claims define the scope of the disclosure and that the method and apparatus within the scope of these claims and their equivalents be covered thereby. This description of the disclosure should be understood to include all novel and non-obvious combinations of elements described herein, and claims may be presented in this or a later application to any novel and non-obvious combination of these elements. Moreover, the foregoing illustrations are illustrative, and no single feature or element is essential to all possible combinations that may be claimed in this or a later application.

I claim:

1. A fluid connector comprising;
a connector body having a central cavity that has a cylindrical bead forming groove and an end support formed therein; and
a tube received within said central cavity and having a bead lock, and said tube has an end that is held in said connector body at said end support;
wherein said bead forming groove is shaped to form said bead lock on said tube such that said tube buckles into said bead forming groove to form said bead lock therein, in response to said tube being forced into said fluid connector and said end of said tube being held against an inner surface of said end support of said fluid connector.

2. The fluid connector of claim 1 further comprising a cylindrical support ring for holding the end of said tube when said bead lock is formed.

3. The fluid connector of claim 1 further comprising a lead section at an end of the internal cavity of said fluid connector, said lead section adjacent to said bead forming groove.

4. The fluid connector of claim 3 further comprising a chamfer section disposed between said bead lock groove and said supporting ring.

5. A fluid connector, comprising;
a connector body having a central cavity that has a cylindrical bead forming groove, an end support, a cylindrical support ring, a lead section, and a chamfer section formed therein; and
a tube received within said central cavity and having a bead lock, and said tube has an end that is held in said the connector body against an inner surface of said the end support, and said end is disposed between said end support and said bead forming groove;
wherein said bead forming groove is shaped to form said bead lock on said tube, such that said tube buckles into said bead forming groove to form said bead lock therein, in response to said tube being forced into said fluid connector and said end of said tube being held against the inner surface of said end support of said fluid connector;
wherein said cylindrical support ring is configured to hold said end of said tube when said bead lock is formed;
wherein said lead section is disposed at an end of said cavity of said fluid connector and adjacent to said bead forming groove; and
wherein said chamfer section is disposed between said bead lock groove and said supporting ring; where said tube is forced into said fluid connector with an end of said tube engaging said support ring and said tube buckling to occupy said bead forming groove and thereby forming said bead lock to retain said tube to said fluid connector.

6. The fluid connector of claim 1, wherein said tube is formed of a malleable material.

7. The fluid connector of claim 6, wherein said bead lock is formed from buckled material of said tube.

8. The fluid connector of claim 7, wherein said tube has a first outside diameter in a first orientation and a second outside diameter less than said first outside diameter in a second orientation.

9. The fluid connector of claim 8, wherein said second diameter is determined prior to said bead lock.

10. A fluid connector comprising:
a connector body having an inner surface defining a central cavity, a groove and an end support; and a tube having a bead lock and a wall that terminates at an end that is held between said end support and said groove; wherein said inner surface is configured to form said bead lock in said wall in response to said end of said tube being forced into direct contact with an inner surface of said end support of said connector body.

11. The fluid connector of claim 10, wherein said inner surface defines a lead section that is configured to guide said tube into said connector body.

12. The fluid connector of claim 10, wherein said inner surface defines a support ring that is disposed adjacent to said end support and is configured to support said tube when said bead lock is formed in said tube.

13. The fluid connector of claim 12, wherein said inner surface defines a chamfer section disposed adjacent to said support ring and is configured to guide the tube into said support ring.

14. The fluid connector of claim 10, wherein said connector body consists of a single-piece body.

15. The fluid connector of claim 10, wherein said connector body has an outside surface and a hose nipple formed on said outside surface.

16. The fluid connector of claim 15, wherein said hose nipple has an outer diameter that is less than an outside diameter of said tube.

17. The fluid connector of claim 15, wherein said hose nipple is spaced apart from a groove along a longitudinal axis of said connector body.

18. The fluid connector of claim 15, wherein said hose nipple includes a plurality of ridges.

19. The fluid connector of claim 15, wherein said connector body terminates on one end with a chamfer, and said chamfer adjacent to said hose nipple.

\* \* \* \* \*